(12) United States Patent
Kodera et al.

(10) Patent No.: US 8,627,917 B2
(45) Date of Patent: Jan. 14, 2014

(54) STEERING SYSTEM OF INDUSTRIAL MACHINE AND METHOD OF CHANGING BODY-ARTICULATING ANGLE

(75) Inventors: Hiroyasu Kodera, Kobe (JP); Shinichiro Tanaka, Kakogawa (JP)

(73) Assignees: Kabushiki Kaisha KCM, Inami-Cho (JP); Hitachi Construction Machinery Co., Ltd., Tokyo (JP)

( * ) Notice: Subject to any disclaimer, the term of this patent is extended or adjusted under 35 U.S.C. 154(b) by 14 days.

(21) Appl. No.: 13/321,649

(22) PCT Filed: Feb. 28, 2011

(86) PCT No.: PCT/JP2011/001155
§ 371 (c)(1),
(2), (4) Date: Jan. 24, 2012

(87) PCT Pub. No.: WO2011/121886
PCT Pub. Date: Oct. 6, 2011

(65) Prior Publication Data
US 2012/0118661 A1    May 17, 2012

(30) Foreign Application Priority Data
Mar. 31, 2010  (JP) .................................. 2010-082989

(51) Int. Cl.
*B62D 5/06*  (2006.01)
(52) U.S. Cl.
USPC .......................... 180/441; 180/417; 180/418
(58) Field of Classification Search
USPC .................................... 180/417, 441, 418
See application file for complete search history.

(56) References Cited

U.S. PATENT DOCUMENTS

| | | | | |
|---|---|---|---|---|
| 3,750,834 A * | 8/1973 | Luft | ................. | 180/414 |
| 5,215,158 A * | 6/1993 | Pedersen | .................. | 180/403 |
| 6,408,977 B1 * | 6/2002 | Obertrifter et al. | ........... | 180/442 |
| 6,712,176 B2 * | 3/2004 | Zenker et al. | ................. | 180/403 |
| 7,334,658 B2 * | 2/2008 | Berg et al. | ..................... | 180/333 |
| 7,597,168 B2 * | 10/2009 | Anderson et al. | ............. | 180/247 |
| 7,913,801 B2 * | 3/2011 | Nakamura et al. | ............ | 180/442 |
| 2007/0209356 A1 * | 9/2007 | Graeve et al. | .................. | 60/422 |
| 2008/0277190 A1 * | 11/2008 | McCord et al. | ................ | 180/444 |
| 2012/0109459 A1 * | 5/2012 | Bichler et al. | .................. | 701/41 |

FOREIGN PATENT DOCUMENTS

| | | |
|---|---|---|
| JP | B2-5-9310 | 2/1993 |
| JP | A-2002-512922 | 5/2002 |
| JP | A-2003-269402 | 9/2003 |
| JP | A-2005-535487 | 11/2005 |

(Continued)

OTHER PUBLICATIONS

International Search Report dated Apr. 5, 2011 in International Application No. PCT/JP2011/001155 (with translation).

*Primary Examiner* — J. Allen Shriver, II
*Assistant Examiner* — Conan Duda
(74) *Attorney, Agent, or Firm* — Oliff & Berridge, PLC

(57) ABSTRACT

A steering system, in a state where a first steering means is not operated, a third signal pressure output means outputs a third signal pressure in response to a second signal pressure fed to the third signal pressure output means, and feeding and discharging control means operates based in the third signal pressure, while in a state where the first steering means is operated, the third signal pressure output means stops outputting of the third signal pressure regardless of whether or not the second signal pressure is fed to the third signal pressure output means, and the feeding and discharging control means operates based on the first signal pressure.

8 Claims, 5 Drawing Sheets

(56) References Cited

FOREIGN PATENT DOCUMENTS

| | | |
|---|---|---|
| JP | A-2007-506604 | 3/2007 |
| JP | A-2008-143456 | 6/2008 |
| JP | A-2010-23674 | 2/2010 |
| WO | WO 99/55573 A1 | 11/1999 |
| WO | WO 03/099637 A1 | 12/2003 |
| WO | WO 2005/007488 A1 | 1/2005 |
| WO | WO 2008/090883 A1 | 7/2008 |

* cited by examiner

| SWITCHING 30 | STEERING WHEEL 23 | STEERING LEVER 24 | POWER STEERING UNIT DIRECTION SWITCHING VALVE 38 | PILOT SWITCHING VALVE 28 | ELECTROMAGNETIC SWITCHING VALVE 29 | SIGNAL PRESSURE |
|---|---|---|---|---|---|---|
| ON | OFF | OFF | FIRST POSITION | FIRST POSITION | SECOND POSITION | — |
| ON | ON | OFF | SECOND/THIRD POSITION | FIRST POSITION | FIRST POSITION | FIRST SIGNAL PRESSURE |
| ON | OFF | ON | FIRST POSITION | SECOND/THIRD POSITION | SECOND POSITION | THIRD SIGNAL PRESSURE |
| ON | ON | ON | SECOND/THIRD POSITION | SECOND/THIRD POSITION | FIRST POSITION | FIRST SIGNAL PRESSURE |
| OFF | OFF | OFF | FIRST POSITION | FIRST POSITION | FIRST POSITION | — |
| OFF | ON | OFF | SECOND/THIRD POSITION | FIRST POSITION | FIRST POSITION | FIRST SIGNAL PRESSURE |
| OFF | OFF | ON | FIRST POSITION | SECOND/THIRD POSITION | FIRST POSITION | — |
| OFF | ON | ON | SECOND/THIRD POSITION | SECOND/THIRD POSITION | FIRST POSITION | FIRST SIGNAL PRESSURE |

Fig.4

STEERING SYSTEM OF INDUSTRIAL MACHINE AND METHOD OF CHANGING BODY-ARTICULATING ANGLE

TECHNICAL FIELD

The present invention relates to a steering system incorporated into an industrial machine such as a wheel loader, and a method of changing a body-articulating angle of the industrial machine.

BACKGROUND ART

A self-propelled industrial machine includes a steering means such as a steering wheel or a steering lever, and a hydraulic or electric steering system for adjusting a body-articulating angle according to an operator's operation of the steering means (see Patent Literature 1).

CITATION LISTS

Patent Literature

Patent Literature 1: Japanese Laid-Open Patent Application Publication No. 2003-269402

SUMMARY OF THE INVENTION

Technical Problem

A device for adjusting the body-articulating angle according to the operation of the steering lever could be incorporated into the system including the steering wheel as a single steering means as disclosed in Patent Literature 1, to construct a steering system including two steering means.

When such a device is incorporated into the steering system, electric components are preferably decreased as much as possible. With an increase in the electric components, an occasion where an electric failure arises in the system may increase. If the electric failure occurs, it becomes difficult to stably control the body-articulating angle. Just incorporating a device for adjusting the body-articulating angle in response to the operation of a different steering means into a system including a certain steering means will not allow the body-articulating angle to be controlled stably when the two steering means are operated together unexpectedly.

Accordingly, an object of the present invention is to suitably adjust a body-articulating angle of an industrial machine including two steering means.

Solution to Problem

The present invention has been developed to achieve the above object, and a steering system for an industrial machine of the present invention comprises a body-articulating angle changing means for changing a body-articulating angle of the industrial machine, by receiving and discharging pressurized oil; first and second steering means provided in the industrial machine and operated by an operator; a first signal pressure output means for outputting a first signal pressure mechanically responsively to an operation of the first steering means; a second signal pressure output means for outputting a second signal pressure mechanically responsively to an operation of the second steering means; a third signal pressure output means which selects whether or not the third signal pressure output means outputs a third signal pressure, in response to the second signal pressure fed to the third signal pressure output means; and feeding and discharging control means for controlling feeding and discharging of the pressurized oil with respect to the body-articulating angle changing means, based on the first signal pressure or the third signal pressure fed to the feeding and discharging control means; wherein in a state where the first steering means is operated, the first signal pressure output means outputs the first signal pressure, while the third signal pressure output means stops outputting of the third signal pressure regardless of whether the second signal pressure is fed to the third signal pressure output means, and the feeding and discharging control means operates based on the first signal pressure fed to the feeding and discharging control means.

In accordance with this configuration, the first signal pressure and the second signal pressure are output mechanically responsively to the operation of the first steering means and the operation of the second steering means, respectively, and the feeding and discharging control means operates based on the first and second signal pressures, thereby allowing the body-articulating angle changing means to operate. Thus, it is possible to decrease the electric components as much as possible to implement a configuration for outputting the signal pressures in response to the operation of respective of the two steering means.

Since the first signal pressure is output in response to the operation of the first steering means, the first signal pressure is not output in the state where the first steering means is not operated. The same applies to the relation between the second signal pressure and the operated state of the second steering means. Whereas the first signal pressure is directly fed to the feeding and discharging control means, the second signal pressure is not directly fed to the feeding and discharging control means but fed to the third signal pressure output means. When the second steering means is operated and the second signal pressure is fed to the third signal pressure output means, the third signal pressure output means is placed in a state where it is able to output the third signal pressure in response to the second signal pressure. The feeding and discharging control means operates based on the third signal pressure output in response to the second signal pressure.

The third signal pressure output means is configured not to output the third signal pressure in response to the second signal pressure, even if the second steering means is operated together with the first steering means being operated, and the second signal pressure is fed to the third signal pressure output means. Thus, in a case where the first and second steering means are operated together, the feeding and discharging control means operates based on the first signal pressure and the body-articulating angle changing means operates in response to the operation of the first steering means.

By providing the third signal pressure output means having the above configuration in a configuration in which the body-articulating angle changing means is operated based on the signal pressure output mechanically responsively to the operation of the steering means, the steering operation of the first steering means is enabled but the steering operation of the second steering means is disenabled in the case where the two steering means are operated together. This makes it possible to prevent the signal pressures output at the same time from interfering with each other, and hence adjust the body-articulating angle stably in response to the enabled operation of the first steering means. This operation is accomplished with components in a hydraulic system. As a result, it is possible to avoid complexity in electric components and control components in the system.

The first steering means may be a rotatable steering wheel. The first signal pressure output means may be a power steering unit which is mechanically coupled to the steering wheel and is operative in response to a rotational operation of the steering wheel. The power steering unit may output the first signal pressure according to a direction in which the steering wheel is rotated and a rotational operation position of the steering wheel.

The second steering means may be a steering lever which is capable of being tilted. The second signal pressure output means may be a pilot valve which is mechanically coupled to the steering lever and is operative in response to a tilting operation of the steering lever; and the pilot valve may output the second signal pressure according to a direction in which the steering lever is tilted and a tilting operation position of the steering lever.

The third signal pressure output means may include: a first switching valve which switches a valve position from a position in which the pressurized oil is blocked by the first switching valve to a position in which the pressurized oil outflows from the first switching valve, in response to the second signal pressure fed to the first switching valve; and a second switching valve which switches a valve position between a first position in which the pressurized oil outflowing from the first switching valve is returned to a tank and a second position in which the pressurized oil is output as the third signal pressure; and in a state where the first steering means is operated, the second switching valve may be placed in the first position.

The third signal pressure output means may include: a first switching valve which switches a valve position from a position in which the pressurized oil is blocked by the first switching valve to a position in which the pressurized oil outflows from the first switching valve, in response to the second signal pressure fed to the first switching valve; and a second switching valve which switches a valve position between a first position in which the pressurized oil outflowing from the first switching valve is blocked by the second switching valve and a second position in which the pressurized oil is output as the third signal pressure; and in a state where the first steering means is operated, the second switching valve may be placed in the first position.

The steering system may further comprise a switching operation means for selecting whether a steering operation of the second steering means is enabled or disenabled; and in a state where the switching operation means is operated to enable the steering operation of the second steering means, the valve position of the second switching valve may be normally the second position and may switch from the second position to the first position when the first steering means is operated; and in a state where the switching operation means is operated to disenable the steering operation of the second steering means, the valve position of the second switching valve may be the first position. In accordance with this, in a state where the switching operation means is operated to disenable the steering operation of the second steering means, the third signal pressure is not output even if the second steering means is operated by mistake.

The first signal pressure output means may output a detection signal pressure which branches from the first signal pressure in a state where the first steering means is operated, and stops outputting of the detection signal pressure in a state where the first steering means is not operated, and the second switching valve may switch the valve position from the second position to the first position, in response to the detection signal pressure fed to the second switching valve. In accordance with this, it can be detected whether or not the first steering means is operated, using the components in the hydraulic system, and whether or not the third signal pressure is permitted to be output can be controlled.

A method of changing a body-articulating angle of an industrial machine including first and second steering means operated by an operator, of the present invention, comprises the steps of: outputting a first signal pressure mechanically responsively to an operation of the first steering means; outputting a second signal pressure mechanically responsively to an operation of the second steering means; outputting a third signal pressure in response to the second signal pressure; and controlling the body-articulating angle of the industrial machine based on the first signal pressure or the third signal pressure; wherein in a state where the first steering means is operated, outputting of the third signal pressure is stopped, regardless of whether or not the second signal pressure is fed, in a selecting step; and in a state where the first steering means is operated, the body-articulating angle is controlled based on the first signal pressure, in the step of controlling the body-articulating angle.

In accordance with this method, like the above mentioned system, changing of the body-articulating angle in response to the operation of the first or second steering means is controlled by mechanical and hydraulic components. In addition, even when the first and second steering means are operated together, it is possible to adjust the body-articulating angle stably in response to the enabled operation of the first steering operation.

The above further objects and features of the invention will more fully be apparent from the following detailed description of preferred embodiment with accompanying drawings.

Advantageous Effect of the Invention

In accordance with the present invention as described above, it is possible to suitably adjust the body-articulating angle of the industrial machine including the two steering means.

BRIEF DESCRIPTION OF THE DRAWINGS

FIG. 1 is a left side view of a wheel loader which is an exemplary industrial machine incorporating a steering system according to an embodiment of the present invention.

FIG. 2A is a front view of a steering wheel as a steering device in the wheel loader of FIG. 1, and FIG. 2B is a side view of a steering lever as the steering device in the wheel loader of FIG. 1.

FIG. 3 is a view of a construction of the steering system incorporated into the wheel loader of FIG. 1.

[FIG.4] FIG. 4 is a view showing the relationship between operated states of the two steering devices and signal pressures fed to a steering valve in the steering system of FIG. 3.

FIG. 5 is a view of a construction of a steering system according to Modified Example of the embodiment of the present invention.

DESCRIPTION OF EMBODIMENT

Hereinafter, an embodiment of the present invention will be described with reference to the drawings. A wheel loader is exemplified as an industrial machine incorporating a steering system according to the embodiment of the present invention. Stated directions are from the perspective of an operator (not shown) in the wheel loader.

[Wheel Loader]

Figure 1:
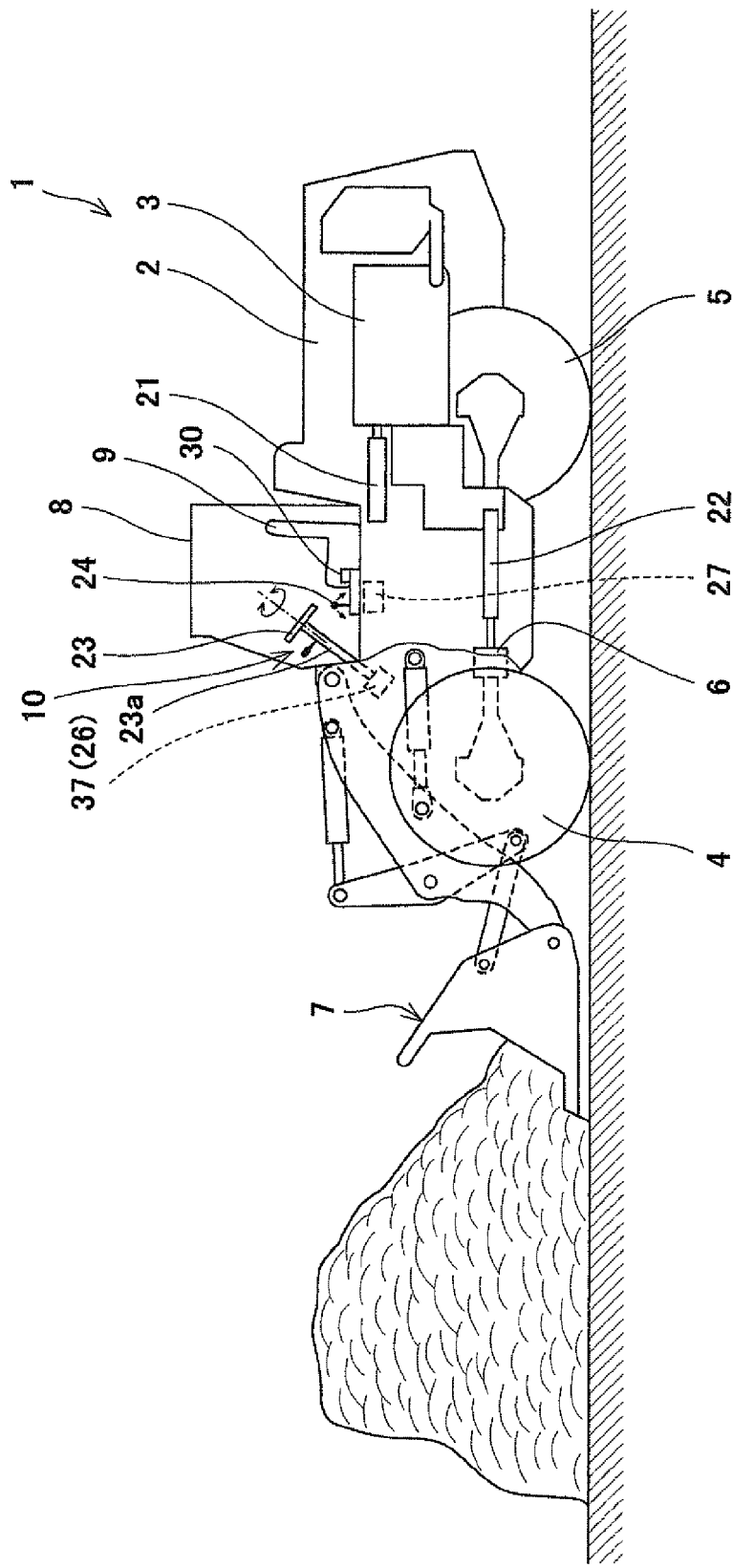
[FIG.1]

As shown in FIG. 1, a wheel loader 1 includes a motor 3 mounted to a vehicle body 2. Front wheels 4 and rear wheels 5 are rotationally driven by the motor 3. The motor 3 is coupled to a pump 21 for feeding pressurized oil. The pump 21 is also driven by the motor 3. The right and left front wheels 4 are coupled to a body-articulating angle adjusting mechanism 6. A pair of right and left steering cylinders (body-articulating angle changing means) 22 are provided between the body-articulating angle adjusting mechanism 6 and the vehicle body 2. The steering cylinders 22 are hydraulic cylinders, which are extended by receiving the pressurized oil discharged from the pump 21 and contracted by discharging of the pressurized oil. According to the extension and contraction of the steering cylinders 22, the body-articulating angle adjusting mechanism 6 is actuated to change the body-articulating angle of the front wheels 4. A work machine 7 is provided at the front portion of the vehicle body 2 to load and dump dirt and the like. A driver's cabin 8 into which the operator can get is provided at the center section of the vehicle body in a forward and backward direction. Inside the driver's cabin 8, a seat 9 on which the operator can be seated and a plurality of operation devices 10 are provided. The operator seated on the seat 9 manipulates the operation devices 10 to drive the wheel loader 1 and perform loading and dumping.

[Steering Device]

The plurality of operation devices 10 include steering devices for changing the body-articulating angle of the front wheels 4 to turn the wheel loader 1. The wheel loader 1 includes two steering devices (first and second steering means). In the present embodiment, a steering wheel 23 and a steering lever 24 are exemplarily described as the two steering devices, but the two steering devices may be other components. Inside the driver's cabin 8, a switch 30 is provided to be operated to select whether the steering operation of the steering lever 24 is enabled or disenabled.

The steering wheel 23 is attached to a steering shaft 23a provided in front of the seat 9 and disposed so as to face the operator seated on the seat 9 in the forward and backward direction. The steering wheel 23 has, for example, a circular-ring shape. The steering wheel 23 is rotatable clockwise and counterclockwise together with the steering shaft 23a. The steering lever 24 is positioned, for example, laterally or forward relative to the seat 9 so that the operator seated on the seat 9 can manipulate the steering lever 24 with one hand. The steering lever 24 has, for example, a stick form, and is movable to be tilted in two directions from a predetermined initial position. The two directions in which the steering lever 24 can be tilted are called "first direction" and "second direction", respectively.

Figure 2:
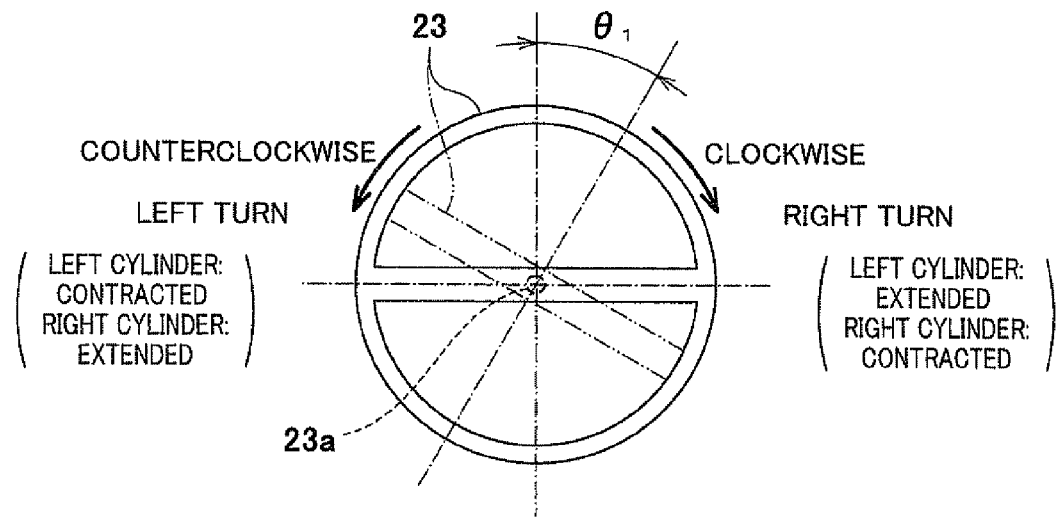
[FIG.2]
Figure 2:
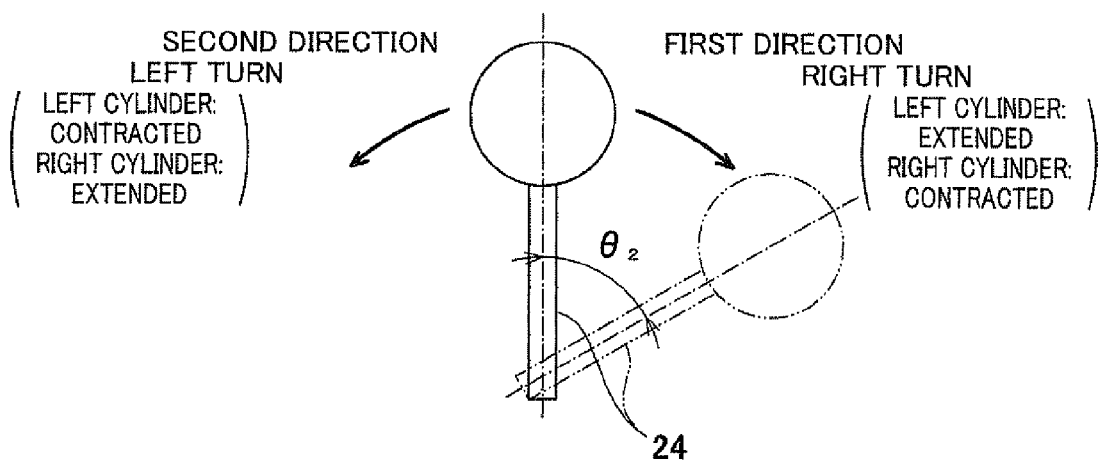

As shown in FIG. 2A, in a state where the steering wheel 23 is in the predetermined initial position (see solid line), the body-articulating angle is 0 degrees and the wheel loader 1 can move straight ahead. When the steering wheel 23 is rotated from the initial position, the body-articulating angle is changed and the wheel loader 1 can turn. At this time, the body-articulating angle is changed such that the rotational operation direction of the steering wheel 23 conforms to the turn direction of the wheel loader 1, and the body-articulating angle increases according to a rotational operation amount θ1 from the initial position.

As shown in FIG. 2B, in a state where the steering lever 24 is in the predetermined initial position (see solid line), the body-articulating angle is 0 degrees and the wheel loader 1 can move straight ahead. When the steering lever 24 is tilted from the initial position, the body-articulating angle is changed from 0 degrees and the wheel loader 1 can turn. At this time, the body-articulating angle is changed such that the wheel loader 1 turns clockwise when the steering lever 24 is tilted in the first direction and turns counterclockwise when the steering lever 24 is tilted in the second direction. Also, the body-articulating angle is changed so as to increase according to a tilting operation amount θ2 from the initial position.

[Steering System]

Figure 3:
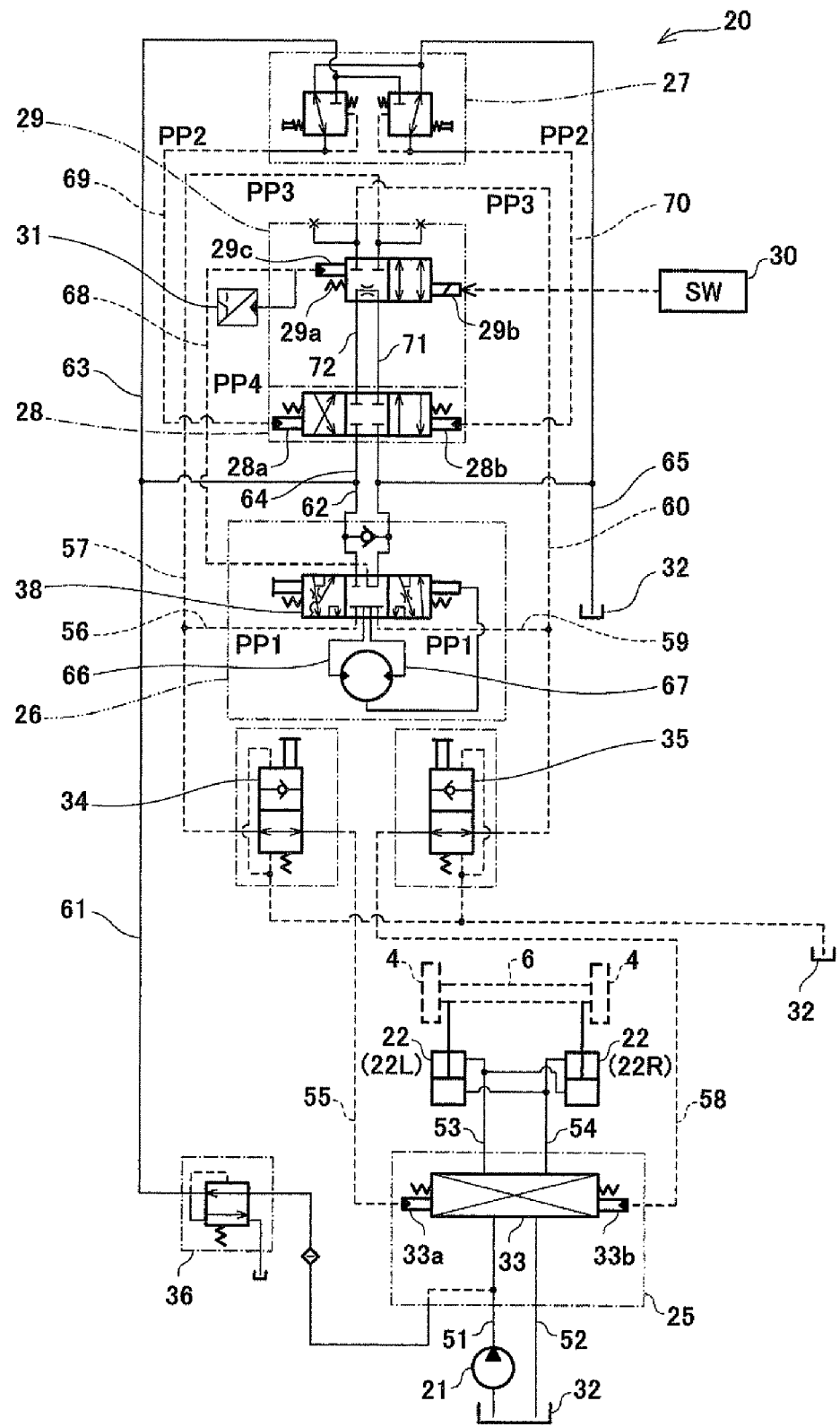
[FIG.3]

As shown in FIG. 3, the wheel loader 1 includes a hydraulic steering system 20 to adjust the body-articulating angle according to the above described operator's operation of the steering devices 23 and 24. The steering system 20 includes a steering valve 25, a power steering unit 26, a pilot valve 27, a pilot switching valve 28, an electromagnetic switching valve 29 and a pressure switch 31, in addition to the pump 21, the left and right steering cylinders 22 (22L, 22R), the steering wheel 23 (see FIG. 1), the steering lever 24 (see FIG. 1), and the switch 30, which are described above.

The pump 21 suctions a hydraulic oil from inside a tank 32 and discharges the pressurized oil through its outlet. Each of the steering cylinders 22L and 22R is coupled to the steering pump 21 and to the tank 32 via the steering valve 25.

The steering valve 25 is coupled with a pump line 51 coupled to the outlet of the pump 21, a tank line 52 coupled to the tank 32, a line 54 coupled to a cylinder side oil chamber of the left steering cylinder 22L and a rod side oil chamber of the right steering cylinder 22R, and a line 53 coupled to a rod side oil chamber of the left steering cylinder 22L and a cylinder side oil chamber of the right steering cylinder 22R. The steering valve 25 has a direction switching valve 33. The direction switching valve 33 is a spring-centered three-way valve, and has a structure in which a pilot port 33a and a pilot port 33b are provided at end portions of spools(not shown), respectively.

In a state where no signal pressure is fed to the respective pilot ports 33a and 33b, the lines 53 and 54 are closed, the operation of the left steering cylinder 22L and the operation of the right steering cylinder 22R are stopped. When a signal pressure is fed to the first pilot port 33a, the pump line 51 is coupled to the line 53 and the tank line 52 is coupled to the line 54. Thereby, the left steering cylinder 22L is contracted, the right steering cylinder 22R is extended, and the body-articulating angle is changed such that the vehicle body is directed to the left. When a signal pressure is fed to the second pilot port 33b, the pump line 51 is coupled to the line 54 and the tank line 52 is coupled to the line 53. Thereby, the left steering cylinder 22L is extended, the right steering cylinder 22R is contracted, and the body-articulating angle is changed such that the vehicle body is directed to the right. Thus, the steering valve 25 controls feeding and discharging of the pressurized oil with respect to the steering cylinders 22L and 22R, based on the signal pressures fed to the pilot ports 33a and 33b. In the manner as described above, the body-articulating angle of the wheel loader 1 is controlled.

A line 55 is coupled to the first pilot port 33a. The line 55 is coupled to the power steering unit 26 via a line 56 and coupled to an electromagnetic switching valve 29 via a line 57. Thus, the power steering unit 26 and the electromagnetic switching valve 29 are coupled in parallel to the first pilot port 33a. A line 58 is coupled to the second pilot port 33b. The line 58 is coupled to the power steering unit 26 via a line 59 and coupled to the electromagnetic switching valve 29 via a line 60. Thus, the power steering unit 26 and the electromagnetic switching valve 29 are coupled in parallel to the second pilot port 33b. A valve 34 and a valve 35 are provided on the line 55 and the line 58, respectively, to adjust a maximum turn angle of the vehicle body.

A line 61 branches from the pump line 51. The line 61 is coupled to the power steering unit 26 via an oil feed line 62, coupled to the pilot valve 27 via an oil feed line 63, and coupled to the pilot switching valve 28 via an oil feed line 64.

A pressure-reducing valve 36 is provided on the line 61 to regulate a pressure of the pressurized oil discharged by the pump 21. The hydraulic oil, the pressure of which has been regulated by the pressure-reducing valve 36, is fed to the power steering unit 26, the pilot valve 27 and the pilot switching valve 28.

The power steering unit 26 is coupled to the steering wheel 23 (see FIG. 1) via the steering shaft 23a (see FIG. 1). When the steering wheel 23 is rotated, a first signal pressure PP1 is output to the line 56 or to the line 59 and a detection signal pressure PP4 is output to a detection line 68, based on the hydraulic oil from the oil feed line 62.

The oil feed line 63 and a return line 65, and lines 69 and 70 are coupled to the pilot valve 27. The line 69 is coupled to a first pilot port 28a of the pilot switching valve 28, while the line 70 is coupled to a second pilot port 28b of the pilot switching valve 28.

The pilot valve 27 is switched such that it is operative mechanically responsively to the operation of the steering lever 24 (see FIG. 1). In a state where the oil feed line 63 is coupled to the lines 69 and 70, the pilot valve 27 outputs to the lines 69 and 70 a second signal pressure PP2 based on the hydraulic oil from the oil feed line 63.

The pilot switching valve 28 includes pilot ports 28a and 28b fed with the second signal pressure PP2 output from the pilot valve 27, When the second signal pressure PP2 is fed to the pilot ports 28a and 28b, connection between the feed line 64 and the return line 65, and the line 71 and the line 72, is established. The lines 71 and 72 respectively couple the pilot switching valve 28 to the electromagnetic switching valve 29.

The above lines 57, 60, 71 and 72 are coupled to the electromagnetic switching valve 29. A spring 29a and a pilot port 29c are provided at one end portion of a spool (not shown) of the electromagnetic switching valve 29, and a solenoid 29b is provided at an opposite end portion of the spool of the electromagnetic switching valve 29.

The solenoid 29b is excited when the switch 30 is operated to enable the steering operation of the steering lever 24, and unexcited when the switch 30 is operated to disenable the steering operation of the steering lever 24. In a state where the solenoid 29b is unexcited, the electromagnetic switching valve 29 is biased by the spring 29a and placed in a first position (left position in FIG. 3). In a state where the solenoid 29b is excited, the electromagnetic switching valve 29 is switched to a second position (right position in FIG. 3) against the biasing force applied by the spring 29a. The above detection line 68 is coupled to the pilot port 29c. When the detection signal pressure PP4 output from the power steering unit 26 is fed to the pilot port 29c, it acts on a pressure-receiving surface of the spool in the same direction as the direction in which the biasing force is applied by the spring 29a. At this time, the electromagnetic switching valve 29 is maintained in the first position regardless of the excited state of the solenoid 29b.

With the electromagnetic switching valve 29 being in the first position, the lines 71 and 72 communicate with each other and the lines 57 and 60 are closed. With the electromagnetic switching valve 29 being in the second position, the line 71 is coupled to the line 57, and the connection line 72 is coupled to the line 60.

[Operation]

FIG. 4 shows the relation between the operated states of the steering devices 23 and 24, the operated state of the switch 30, valve positions of the direction switching valve 38, the pilot switching valve 28, and the electromagnetic switching valve 29, and the signal pressure fed to the steering valve 25. In FIG. 4, regarding the columns of the steering handle 23 and the steering lever 24, "OFF" indicates that the steering handle 23 or the steering lever 24 is in the initial position (unoperated), and "ON" indicates that the steering handle 23 or the steering lever 24 is not in the initial position (operated).

Firstly, description will be given of the states corresponding to second to fifth rows from the top, i.e., the states where the switch 30 is operated to enable the steering operation of the steering lever 24. As shown in the second row from the top in FIG. 4, in the state where the steering wheel 23 is in the initial position, the direction switching valve 38 of the power steering unit 26 is in the first position (center position in FIG. 3). At this time, the oil feed line 62 is closed and the lines 56 and 59 are closed. Because of this, the first signal pressure PP1 is not output from the power steering unit 26. Further, the detection line 68 is coupled to the return line 65, and the pilot port 29c of the electromagnetic switching valve 29 is open to the tank 32. Since the solenoid 29b is excited, the electromagnetic switching valve 29 is in the second position (right position in FIG. 3).

In the state where the steering lever 24 is in the initial position, as shown in FIG. 3, the lines 69 and 70 are coupled to the return line 65 and the oil feed line 63 is closed. Because of this, the second signal pressure PP2 is not output from the pilot valve 27. At this time, the first and second pilot ports 28a and 28b of the pilot switching valve 28 are open to the tank 32. Thereby, the pilot switching valve 28 is in the first position (center position in FIG. 3) and the four lines 64, 65, 71 and 72 coupled to the pilot switching valve 28 are all closed. Because of this, the third signal pressure PP3 based on the hydraulic oil from the oil feed line 64 is not output from the pilot switching valve 28 to the line 71 or 72.

As described above, in the state where the steering wheel 23 is in the initial position and in the state where the steering lever 24 is in the initial position, the first signal pressure PP1 and the third signal pressure PP3 are not fed to the steering valve 25, and the direction switching valve 33 is in the first position. Therefore, the steering cylinders 22L and 22R are not actuated.

As shown in the third row from the top in FIG. 4, when the steering wheel 23 is rotated clockwise from the initial position, the direction switching valve 38 of the power steering unit 26 is in the second position (left position in FIG. 3), while when the steering wheel 23 is rotated counterclockwise from the initial position, the direction switching valve 38 of the power steering unit 26 is in the third position (right position in FIG. 3).

In the state where the direction switching valve 38 is in the second position, the oil feed line 62 is coupled to the line 66 and the line 67 is coupled to the line 59, while the return line 65 is coupled to the line 56. Thereby, the power steering unit 26 outputs to the line 59 the first signal pressure PP1 based on the hydraulic oil from the oil feed line 62, which is fed to the second pilot port 33b of the direction switching valve 33 via the line 58, while the first pilot port 33a is open to the tank 32. In the manner as described above, when the steering wheel 23 is rotated clockwise, the body-articulating angle is changed such that vehicle body is directed to the right, thereby allowing the wheel loader 1 to turn clockwise.

In the state where the direction switching valve 38 is in the third position, the oil feed line 62 is coupled to the line 67 and the line 66 is coupled to the line 56, while the return line 65 is coupled to the line 59. Thereby, the power steering unit 26 outputs to the line 56 the first signal pressure PP1, which is fed to the first pilot port 33a via the line 55, while the second pilot port 33b is open to the tank 32. In the manner as described above, when the steering wheel 23 is rotated counterclockwise, the body-articulating angle is changed such that the vehicle body is directed to the left, thereby allowing the wheel loader 1 to turn counterclockwise.

In the state where the direction switching valve 38 is in the second position or in the third position, the oil feed line 62 is also coupled to the detection line 68, and the detection signal pressure PP4 is fed to the pilot port 29c of the electromagnetic switching valve 29 via the detection line 68. This causes the electromagnetic switching valve 29 to move from the second position to the first position regardless of the excited state of the solenoid 29b. Therefore, the lines 57 and 60 are closed by the electromagnetic switching valve 29. Because of this, even when the switch 30 is operated to enable the steering operation of the steering lever 24, the steering operation of the steering lever 24 is disenabled, and the first signal pressure PP1 output to the line 56 or to the line 59 is suitably fed to the steering valve 25, thereby allowing the body-articulating angle to be adjusted according to the operation of the steering wheel 23.

Description will be given of a case where the steering wheel 23 is not operated and is in the initial position, but the steering lever 24 is operated as shown in the fourth row from the top in FIG. 4. At this time, the direction switching valve 38 of the power steering unit 26 is in the first position, the first signal pressure PP1 is not output from the power steering unit 26, as described above, the pilot port 29c of the electromagnetic switching valve 29 is open to the tank 32, and the solenoid 29b is excited in response to the operation of the switch 30. Therefore, the electromagnetic switching valve 29 is in the second position (right position in FIG. 3).

When the steering lever 24 is operated from the initial position in the first direction (see FIG. 2), the line 69 is kept coupled to the line 65, the line 70 operates mechanically responsively to the operation of the steering lever 24 and is coupled to the oil feed line 63, and the return line 65 is closed. Thereby, the pilot valve 27 outputs to the line 70 the second signal pressure PP2 based on the hydraulic oil from the oil feed line 63, which is fed to the second pilot port 28b of the pilot switching valve 28, while the first pilot port 28a is open. Thereby, the pilot switching valve 28 is in the third position (right position in FIG. 3), the oil feed line 64 is coupled to the line 72 and the return line 65 is coupled to the line 71. Since the electromagnetic switching valve 29 is in the second position, the oil feed line 64 is coupled to the line 60 via the line 72 and the electromagnetic switching valve 29, while the line 57 is coupled to the return line 65 via the electromagnetic switching valve 29 and the line 71. Thereby, the third signal pressure PP3 based on the hydraulic oil from the oil feed line 64 is output to the line 60 via the electromagnetic switching valve 29 and fed to the second pilot port 33b of the direction switching valve 33 via the line 58, while the first pilot port 33a is open to the tank 32. Thus, when the steering lever 24 is operated in the first direction, the body-articulating angle is changed such that the vehicle body is directed to the right, thereby allowing the wheel loader 1 to turn clockwise.

When the steering lever 24 is operated from the initial position in the second direction (see FIG. 2), the line 70 is kept coupled to the line 65, and the line 69 operates mechanically responsively to the operation of the steering lever 24 and is coupled to the oil feed line 63, and the return line 65 is closed. Thereby, the pilot valve 27 outputs to the line 69 the second signal pressure PP2 based on the hydraulic oil from the oil feed line 63, which is fed to the first pilot port 28a of the pilot switching valve 28, while the second pilot port 28b is open to the tank 32. At this time, the pilot switching valve 28 is in the second position (left position in FIG. 3), the oil feed line 64 is coupled to the line 71, and the return line 65 is coupled to the line 72. Since the electromagnetic switching valve 29 is in the second position, the oil feed line 64 is coupled to the line 57 via the line 71 and the electromagnetic switching valve 29, while the line 60 is coupled to the return line 65 via the electromagnetic switching valve 29 and the line 72. Thereby, the third signal pressure PP3 based on the hydraulic oil from the oil feed line 64 is output to the line 57 via the electromagnetic switching valve 29 and fed to the first pilot port 33a of the direction switching valve 33 via the line 55, while the second pilot port 33b is open to the tank 32. Thus, when the steering lever 24 is operated in the second direction, the body-articulating angle is changed such that the vehicle body is directed to the left, thereby allowing the wheel loader 1 to turn counterclockwise.

When the steering lever 24 is operated singly, the direction switching valve 38 of the power steering unit 26 is in the first position and the lines 56 and 59 are closed by the direction switching valve 38. Because of this, the third signal pressure PP3 output to the line 57 or to the line 60 is suitably fed to the steering valve 25, thereby allowing the body-articulating angle to be adjusted suitably according to the operation of the steering lever 24.

Turning to the fifth row from the top in FIG. 4, when the steering wheel 23 and the steering lever 24 are operated together, the power steering unit 26 outputs the first signal pressure PP1 to the line 56 or to the line 59 according to the direction in which the steering wheel 23 is operated. Also, the power steering unit 26 outputs the detection signal pressure PP4 and the electromagnetic switching valve 29 is in the first position. Also, the pilot valve 27 outputs the second signal pressure PP2 to the line 69 or to the line 70 according to the direction in which the steering lever 24 is operated, the pilot switching valve 28 is in the second position or in the third position, and the oil feed line 64 is coupled to the line 71 or to the line 72. However, the electromagnetic switching valve 29 is in the first position, and therefore, the hydraulic oil from the oil feed line 64 is returned to the tank 32 via the electromagnetic switching valve 29.

As described above, when the steering lever 24 is operated together with the steering wheel 23, the third signal pressure PP3 is not output even though the steering lever 24 is operated, and the steering operation of the steering lever 24 is disenabled. This makes it possible to prevent the first signal pressure PP1 and the third signal pressure PP3 from interfering with each other in the lines 55 and 58. The steering valve 25 is controlled in accordance with the first signal pressure PP1 output from the power steering unit 26 and the body-articulating angle is adjusted according to the operation of the steering wheel 23.

Next, description will be given of the states corresponding to sixth to ninth rows from the top in FIG. 4, i.e., the states where the switch 30 is operated to disenable the steering operation of the steering lever 24. In this case, the electromagnetic switching valve 29 is unexcited, and therefore is fixed in the first position by the biasing force applied by the spring 29b. As shown in the sixth row from the top in FIG. 4, when both of the steering wheel 23 and the steering lever 24 are in the initial positions, respectively, the first signal pressure PP1, the second signal pressure PP2, the third pressure signal PP3, and the detection signal pressure PP4 are not output like the states corresponding to the second row from the top.

As shown in the seventh row from the top in FIG. 4, when the steering wheel 23 is operated and the steering lever 24 is in the initial position, the power steering unit 26 outputs the first signal pressure PP1 and the pilot valve 27 does not output the second signal pressure PP2, so that the body-articulating angle is changed according to the operation of the steering wheel 23, like the state corresponding to the third row from the top in FIG. 4.

As shown in the eighth row from the top in FIG. 4, when the steering wheel 23 is in the initial position and the steering lever 24 is operated from the initial position, the power steering unit 26 does not output the first signal pressure PP1, the pilot valve 27 outputs the second signal pressure PP2 according to the direction in which the steering lever 24 is operated, and the pilot switching valve 28 moves to the second position or to the third position. However, since the electromagnetic switching valve 29 is in the first position, the hydraulic oil from the oil feed line 64 is returned to the tank 32. Because of this, the first signal pressure PP1 and the third signal pressure PP3 are not fed to the steering valve 25, and the body-articulating angle is not changed even though the steering lever 24 is operated.

As shown in the ninth row from the top in FIG. 4, when the steering wheel 23 and the steering lever 24 are operated together, the power steering unit 26 outputs the first signal pressure PP1 according to the direction in which the steering wheel 23 is operated, like the state corresponding to the fifth row from the top in FIG. 4. Also, the pilot valve 27 outputs the second signal pressure PP2 according to the direction in which the steering lever 24 is operated, to cause the pilot switching valve 28 to move to the second position or to the third position, but the electromagnetic switching valve 29 is in the first position, so that hydraulic oil from the oil feed line 64 is returned to the tank 32. Thereby, the steering valve 25 operates based on the first signal pressure PP1 fed to the steering valve 25, and the body-articulating angle is changed according to the operation of the steering wheel 23.

In accordance with the steering system 20 of the present embodiment, the signal pressures for controlling the operation of the steering valve 25 are output mechanically responsively to the operation of the steering wheel 23 and the operation of the steering lever 24. Thus, the steering system 20 including the two steering devices 23 and 24 is implemented with mechanical and hydraulic components while reducing electronic components as much as possible. Thus, it is possible to provide a system which is highly resistant to an external load.

The means for outputting the signal pressures outputs the signal pressures based on the hydraulic oil, the pressure of which has been regulated by the pressure-reducing valve 36. Since common pressurized oil feed source is used for the respective means for outputting the signal pressures, the configuration of the steering system 20 can be simplified. In addition, since the pressurized oil feed source for these means serves as common pressurized oil feed source for the steering cylinders 22L and 22R, the configuration of the steering system 20 can be further simplified.

Although the steering system 20 includes two steering devices 23 and 24 for adjusting the body-articulating angle, the operation of the steering wheel 23 is treated with priority when they are operated together, and the body-articulating angle is controlled favorably according to the operation of the steering wheel 23.

The switch 30 enables the operator to select enabling or disenabling of the steering operation of the steering lever 24. When the operator operates the switch 30 to disenable the steering operation of the steering lever 24, the body-articulating angle is not changed even if the steering lever 24 is operated by mistake. As a result, reliability of an operation of the steering system including the two steering devices improves. When the switch 30 is operated to disenable the steering operation of the steering lever 24, the solenoid 29b is not supplied with electric power. Preferably, the solenoid 29b is in the same state when electric disconnection occurs.

Alternatively, a pressure switch 31 for detecting whether or not the detection signal pressure PP4 is output may be coupled to the detection line 68. For example, when the steering wheel 23 is operated and the detection signal pressure PP4 is output in a case where the switch 30 is operated to enable the steering operation of the steering lever 24, the solenoid 29b of the electromagnetic switching valve 29 may get unexcited based on the detection signal of the pressure switch 31. This makes it possible to surely place the electromagnetic switching valve 29 in the first position based on the pressing force applied by the hydraulic oil of the detection signal pressure PP4 and the biasing force applied by the spring 29b, and to further improve reliability of the operation of the steering system 20. Even if a failure occurs in the solenoid 29b of the electromagnetic switching valve 29, the electromagnetic switching valve 29 can be placed in the first position based on the biasing force applied by the spring 29a and the oil pressure force fed to the pilot port 29c. Thus, steered state can be ensured using the steering wheel 23.

MODIFIED EXAMPLE

Figure 5:
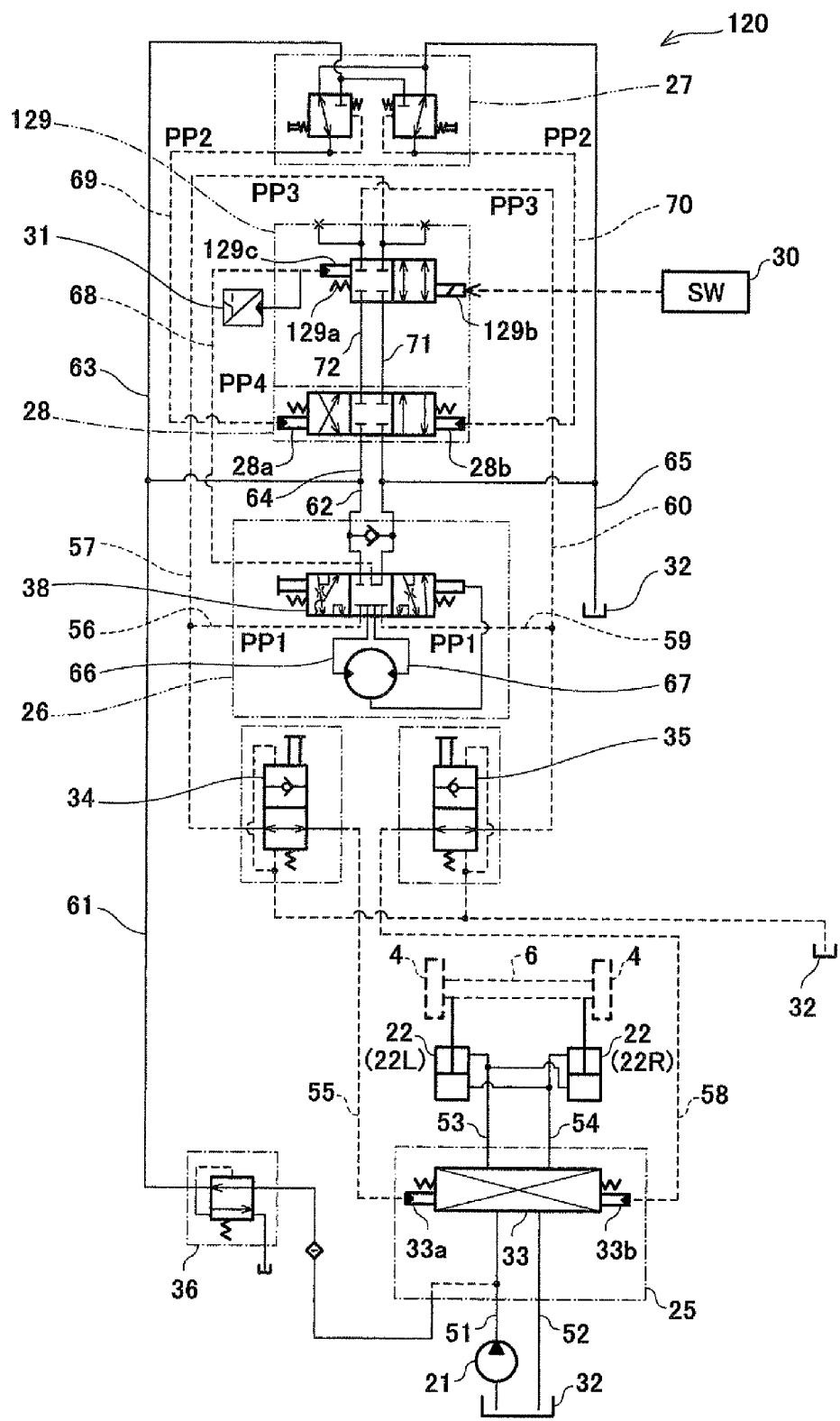
[FIG.5]

FIG. 5 is a view of a configuration of a steering system 120 according to Modified Example of the embodiment of the present invention. In the Modified Example of FIG. 5, an electromagnetic switching valve 129 is different from the valve 29 of the above embodiment.

Like the electromagnetic switching valve 29, the electromagnetic switching valve 129 is coupled to the lines 57, 60, 71, and 72, and includes a spring 129a, a solenoid 129b and a pilot port 129c, like the electromagnetic switching valve 29. Like the electromagnetic switching valve 29, the valve position of the electromagnetic switching valve 129 switches between a first position (left position in FIG. 5) and a second position (right position in FIG. 5) depending on whether or not the solenoid 129b is excited and whether or not the pilot port 129c is fed with the detection signal pressure PP4.

When the electromagnetic switching valve 129 is in the first position, the lines 57 and 60, and the lines 71 and 72 are blocked. When the electromagnetic switching valve 129 is in the second position, the line 71 is coupled to the line 57 and the line 72 is coupled to the line 60 like the electromagnetic switching valve 29.

In the steering system 120 including the electromagnetic switching valve 129 having the above configuration, the relation between the operated state of the steering device 23, the operated state of the switch 30, and the position of the electromagnetic switching valve 129 is the same as that of the above embodiment. In addition, the operated states of the steering devices 23 and 24, the operated state of the switch 30 and the signal pressure fed to the steering valve 25 is the same as that of the above embodiment.

In the state corresponding to the third row from the top in FIG. 4, since the detection signal pressure PP4 is fed to the pilot port 129c, the electromagnetic switching valve 129 is in the first position. Since the lines 71 and 72 are closed both by the electromagnetic switching valve 129 and by the direction switching valve 28, the third signal pressure PP3 is not output from the electromagnetic switching valve 129. Therefore, the first signal pressure PP1 in response to the operation of the steering wheel 23 is fed to the steering valve 25.

In the state corresponding to the fifth row from the top in FIG. 4, since the detection signal pressure PP4 is fed to the pilot port 129c, the electromagnetic switching valve 129 is in the first position. The direction switching valve 28 is in the second position (left position in FIG. 5) or in the third position (right position in FIG. 5) according to the direction in which the steering lever 24 is operated. When the direction switching valve 28 is in the second position, the line 71 is coupled to the oil feed line 64,while when the direction switching valve 28 is in the third position, the line 72 is coupled to the oil feed line 64. Regardless of whether the direction switching valve 28 is in the second position or in the third position, the lines 71 and 72 are closed by the electromagnetic switching valve 129, and therefore the third signal pressure PP3 is not output from the electromagnetic switching valve 129. Therefore, the first signal pressure PP1 in response to the operation of the steering wheel 23 is fed to the steering valve 25.

In the states corresponding to the sixth row and the seventh row from the top in FIG. 4, when the steering wheel 23 and the steering lever 24 are both in the initial positions, the lines 71 and 72 are closed by the direction switching valve 28 and the electromagnetic switching valve 129, and therefore the third signal pressure PP3 is not output from the electromagnetic switching valve 129.

The states corresponding to the eighth row and the ninth row from the top in FIG. 4 are the same as the state corresponding to the fifth row from the top in FIG. 4. That is, regardless of whether the direction switching valve 28 is in the second position or in the third position, the lines 71 and 72 are closed by the electromagnetic switching valve 129, and therefore the third signal pressure PP3 is not output from the electromagnetic switching valve 129.

Therefore, in the steering system 120 according to the Modified Example can achieve the advantages as those of the above embodiment.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention. Although the wheel loader is exemplarily descried as an industrial machine incorporating the steering system of the present embodiment, the present invention is widely applicable to industrial machines having other steering functions.

Industrial Applicability

The present invention can suitably adjust a body-articulating angle of an industrial machine including two steering means and is useful in the use of self-propelled industrial machines having steering functions.

REFERENCE SIGNS LISTS 1 wheel loader (industrial machine)
4 front wheel
20 steering system
21 pump
22 steering cylinder (body-articulating angle changing means)
23 steering wheel (first steering means)
24 steering lever (second steering means)
25 steering valve (feeding and discharging control means)
26 power steering unit (first signal pressure output means)
27 pilot valve (second signal pressure output means)
28 pilot switching valve (third signal pressure output means, first switching valve)
29 electromagnetic switching valve (third signal pressure output means, second switching valve)
30 switch (switching operation means)
31 pressure switch
PP1 first signal pressure
PP2 second signal pressure
PP3 third signal pressure
PP4 detection signal pressure

The invention claimed is:

1. A steering system for an industrial machine comprising:
a body-articulating angle changing means for changing a body-articulating angle of the industrial machine, by receiving and discharging pressurized oil;
first and second steering means provided in the industrial machine and operated by an operator;
a first signal pressure output means for outputting a first signal pressure mechanically responsively to an operation of the first steering means;
a second signal pressure output means for outputting a second signal pressure mechanically responsively to an operation of the second steering means;
a third signal pressure output means which selects whether or not the third signal pressure output means outputs a third signal pressure, in response to the second signal pressure fed to the third signal pressure output means; and
feeding and discharging control means coupled to the first signal pressure output means and to the third signal pressure output means. for controlling feeding and discharging of the pressurized oil with respect to the body-articulating angle changing means, based on the first signal pressure or the third signal pressure fed to the feeding and discharging control means;
wherein in a state where the first steering means is operated, the first signal pressure output means outputs the first signal pressure, while the third signal pressure output means stops outputting of the third signal pressure regardless of whether the second signal pressure is fed to the third signal pressure output means, and the feeding and discharging control means operates based on the first signal pressure fed to the feeding and discharging control means.

2. The steering system for an industrial machine according to Claim 1,
wherein the first steering means is a rotatable steering wheel;
the first signal pressure output means is a power steering unit which is mechanically coupled to the steering wheel and is operative in response to a rotational operation of the steering wheel; and
the power steering unit outputs the first signal pressure according to a direction in which the steering wheel is rotated and a rotational operation position of the steering wheel.

3. The steering system for an industrial machine according to claim 1,
wherein the second steering means is a steering lever which is capable of being tilted;
the second signal pressure output means is a pilot valve which is mechanically coupled to the steering lever and is operative in response to a tilting operation of the steering lever; and
the pilot valve outputs the second signal pressure according to a direction in which the steering lever is tilted and a tilting operation position of the steering lever.

4. The steering system for an industrial machine according to claim 1,
wherein the third signal pressure output means includes:
a first switching valve which switches a valve position from a position in which the pressurized oil is blocked by the first switching valve to a position in which the pressurized oil outflows from the first switching valve, in response to the second signal pressure fed to the first switching valve; and a second switching valve which switches a valve position between a first position in which the pressurized oil outflowing from the first switching valve is returned to a tank and a second position in which the pressurized oil is output as the third signal pressure;

wherein in a state where the first steering means is operated, the second switching valve is placed in the first position.

5. The steering system for an industrial machine according to claim 1, wherein the third signal pressure output means includes:

a first switching valve which switches a valve position from a position in which the pressurized oil is blocked by the first switching valve to a position in which the pressurized oil outflows from the first switching valve, in response to the second signal pressure fed to the first switching valve; and a second switching valve which switches a valve position between a first position in which the pressurized oil outflowing from the first switching valve is blocked by the second switching valve and a second position in which the pressurized oil is output as the third signal pressure;

wherein in a state where the first steering means is operated, the second switching valve is placed in the first position.

6. The steering system for an industrial machine according to claim 4, further comprising:

a switching operation means for selecting whether a steering operation of the second steering means is enabled or disenabled;

wherein in a state where the switching operation means is operated to enable the steering operation of the second steering means, the valve position of the second switching valve is normally the second position and switches from the second position to the first position, when the first steering means is operated; and wherein in a state where the switching operation means is operated to disenable the steering operation of the second steering means, the valve position of the second switching valve is the first position.

7. The steering system for an industrial machine according claim 4, wherein the first signal pressure output means outputs a detection signal pressure which branches from the first signal pressure in a state where the first steering means is operated, and stops outputting of the detection signal pressure in a state where the first steering means is not operated, and the second switching valve switches the valve position from the second position to the first position, in response to the detection signal pressure fed to the second switching valve.

8. A method of changing a body-articulating angle of an industrial machine including first and second steering means operated by an operator, comprising the steps of:

outputting a first signal pressure mechanically responsively to an operation of the first steering means;

outputting a second signal pressure mechanically responsively to an operation of the second steering means;

selecting whether or not to output a third signal pressure in response to the second signal pressure; and controlling the body-articulating angle of the industrial machine based on the first signal pressure or the third signal pressure, by a feeding and discharging control means coupled to a first signal pressure output means for outputting the first signal pressure and to a third signal pressure output means for outputting the third signal pressure;

wherein in a state where the first steering means is operated, outputting of the third signal pressure is stopped, regardless of whether or not the second signal pressure is fed, in the selecting step; and in a state where the first steering means is operated, the body-articulating angle is controlled based on the first signal pressure, in the step of controlling the body-articulating angle.

* * * * *